(12) United States Patent
Zhu et al.

(10) Patent No.: US 7,747,988 B2
(45) Date of Patent: Jun. 29, 2010

(54) SOFTWARE FEATURE USAGE ANALYSIS AND REPORTING

(75) Inventors: Wenli Zhu, Beijing (CN); Yantao Li, Beijing (CN); Qiang Wang, Beijing (CN); Haidong Zhang, Beijing (CN); Bing Sun, Beijing (CN); Guowei Liu, Beijing (CN); Shuguang Ye, Beijing (CN); Min Wang, Beijing (CN); Adan Azfar Mahmud, Kirkland, WA (US); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 210 days.

(21) Appl. No.: 11/818,600

(22) Filed: Jun. 15, 2007

(65) Prior Publication Data

US 2008/0313633 A1    Dec. 18, 2008

(51) Int. Cl.
G06F 9/44    (2006.01)
(52) U.S. Cl. .................... 717/131; 717/130
(58) Field of Classification Search ................ 717/713, 717/131, 130; 718/100
See application file for complete search history.

(56) References Cited

U.S. PATENT DOCUMENTS

| | | | |
|---|---|---|---|
| 4,068,298 A | 1/1978 | Dechant et al. | |
| 5,500,941 A | 3/1996 | Gil | |
| 5,542,070 A | 7/1996 | LeBlanc et al. | |
| 5,548,718 A | 8/1996 | Siegel et al. | |
| 5,619,709 A | 4/1997 | Caid et al. | |
| 5,774,660 A | 6/1998 | Brendel et al. | |
| 5,867,144 A | 2/1999 | Wyard | |
| 5,903,886 A | 5/1999 | Heimlich et al. | |
| 5,956,720 A | 9/1999 | Fernandez et al. | |
| 6,046,741 A | 4/2000 | Hochmuth | |
| 6,079,032 A * | 6/2000 | Peri | 714/38 |
| 6,128,279 A | 10/2000 | O'Neil et al. | |

(Continued)

FOREIGN PATENT DOCUMENTS

EP    1083486 A1    3/2001

(Continued)

OTHER PUBLICATIONS

Donnell, Jack, Java* Performance Profiling using the VTune™ Performance Analyzer White Pater, Intel, 2004.*

(Continued)

*Primary Examiner*—Paul L Rodriguez
*Assistant Examiner*—Aniss Chad
(74) *Attorney, Agent, or Firm*—Hope Baldauff Hartman, LLC

(57) ABSTRACT

Described is a technology for analyzing usage of a software program's features. Software instrumentation data is collected during actual user program usage sessions. The collected data is then processed to determine various feature usage counts and other information, cross-feature usage (e.g., among users who use a feature, how many use another feature or program), and characteristics of feature users, e.g., how long, how much, how often and how extensive feature users use a program. Session analysis may be performed to provide information about the number of sessions in which a set of features occur. Feature usage trends over time may also be determined via analysis. A user interface is described for facilitating selection of one or more features to analyze, for facilitating selection of a group of users, and/or for outputting results corresponding to the analysis.

20 Claims, 6 Drawing Sheets

U.S. PATENT DOCUMENTS

| | | | |
|---|---|---|---|
| 6,131,082 A | 10/2000 | Hargrave, III et al. | |
| 6,138,159 A | 10/2000 | Phaal | |
| 6,144,962 A | 11/2000 | Weinberg et al. | |
| 6,154,746 A | 11/2000 | Berchtold et al. | |
| 6,167,358 A | 12/2000 | Othmer et al. | |
| 6,182,139 B1 | 1/2001 | Brendel | |
| 6,233,570 B1 | 5/2001 | Horvitz et al. | |
| 6,237,138 B1 | 5/2001 | Hameluck et al. | |
| 6,237,143 B1 | 5/2001 | Fontana et al. | |
| 6,260,050 B1 | 7/2001 | Yost et al. | |
| 6,317,750 B1 | 11/2001 | Tortolani et al. | |
| 6,374,369 B1 | 4/2002 | O'Donnell | |
| 6,385,604 B1 | 5/2002 | Bakalash et al. | |
| 6,418,427 B1 | 7/2002 | Egilsson et al. | |
| 6,434,544 B1 | 8/2002 | Bakalash et al. | |
| 6,564,174 B1 | 5/2003 | Ding et al. | |
| 6,567,796 B1 | 5/2003 | Yost et al. | |
| 6,587,970 B1 | 7/2003 | Wang et al. | |
| 6,601,062 B1 | 7/2003 | Deshpande et al. | |
| 6,633,782 B1 | 10/2003 | Schleiss et al. | |
| 6,662,362 B1* | 12/2003 | Arora et al. | 717/154 |
| 6,701,363 B1 | 3/2004 | Chiu et al. | |
| 6,714,940 B2 | 3/2004 | Kelkar | |
| 6,748,555 B1 | 6/2004 | Teegan et al. | |
| 6,754,312 B1 | 6/2004 | Gundlach | |
| 6,768,986 B2 | 7/2004 | Cras et al. | |
| 6,801,940 B1* | 10/2004 | Moran et al. | 709/224 |
| 6,816,898 B1 | 11/2004 | Scarpelli et al. | |
| 6,845,474 B2 | 1/2005 | Circenis et al. | |
| 6,862,696 B1 | 3/2005 | Voas et al. | |
| 6,901,347 B1 | 5/2005 | Murray et al. | |
| 6,901,536 B2 | 5/2005 | Davenport | |
| 6,912,692 B1 | 6/2005 | Pappas | |
| 6,963,826 B1 | 11/2005 | Hanaman et al. | |
| 7,003,766 B1 | 2/2006 | Hong | |
| 7,028,225 B2 | 4/2006 | Maso et al. | |
| 7,032,214 B1* | 4/2006 | Rodrigues et al. | 717/130 |
| 7,039,166 B1 | 5/2006 | Peterson et al. | |
| 7,062,483 B2 | 6/2006 | Ferrari et al. | |
| 7,080,091 B2 | 7/2006 | Matsuda | |
| 7,111,282 B2 | 9/2006 | Stephenson | |
| 7,117,208 B2 | 10/2006 | Tamayo et al. | |
| 7,131,070 B1 | 10/2006 | Motoyama et al. | |
| 7,171,406 B2 | 1/2007 | Chen et al. | |
| 7,185,231 B2 | 2/2007 | Mullally et al. | |
| 7,194,386 B1* | 3/2007 | Parikh et al. | 702/188 |
| 7,197,447 B2 | 3/2007 | Susskind | |
| 7,216,341 B2 | 5/2007 | Guarraci | |
| 7,315,849 B2 | 1/2008 | Bakalash et al. | |
| 7,333,982 B2 | 2/2008 | Bakalash et al. | |
| 7,392,248 B2 | 6/2008 | Bakalash et al. | |
| 7,401,331 B2 | 7/2008 | Leung | |
| 7,627,564 B2 | 12/2009 | Yao et al. | |
| 2001/0044705 A1 | 11/2001 | Vardi et al. | |
| 2002/0083003 A1 | 6/2002 | Halliday et al. | |
| 2002/0144124 A1 | 10/2002 | Remer et al. | |
| 2003/0009507 A1* | 1/2003 | Shum | 709/104 |
| 2003/0115207 A1 | 6/2003 | Bowman et al. | |
| 2004/0049505 A1 | 3/2004 | Pennock | |
| 2004/0088699 A1* | 5/2004 | Suresh | 717/174 |
| 2004/0117760 A1 | 6/2004 | McFarling | |
| 2004/0122646 A1 | 6/2004 | Colossi et al. | |
| 2004/0133882 A1 | 7/2004 | Angel et al. | |
| 2004/0191743 A1 | 9/2004 | Chiu et al. | |
| 2004/0230858 A1 | 11/2004 | Susskind | |
| 2005/0015683 A1 | 1/2005 | Clark et al. | |
| 2005/0021293 A1 | 1/2005 | Elbel et al. | |
| 2005/0065910 A1 | 3/2005 | Welton et al. | |
| 2005/0071807 A1 | 3/2005 | Yanavi | |
| 2005/0081206 A1* | 4/2005 | Armstrong et al. | 718/100 |
| 2005/0125777 A1* | 6/2005 | Calder et al. | 717/131 |
| 2005/0131924 A1 | 6/2005 | Hjones | |
| 2005/0182750 A1 | 8/2005 | Krishna et al. | |
| 2005/0183143 A1 | 8/2005 | Anderholm et al. | |
| 2005/0278290 A1 | 12/2005 | Bruce et al. | |
| 2005/0278378 A1 | 12/2005 | Frank | |
| 2006/0075399 A1 | 4/2006 | Loh et al. | |
| 2006/0106793 A1 | 5/2006 | Liang | |
| 2006/0116981 A1 | 6/2006 | Krimmel et al. | |
| 2006/0174346 A1 | 8/2006 | Carroll et al. | |
| 2006/0218138 A1 | 9/2006 | Weare | |
| 2006/0242636 A1* | 10/2006 | Chilimbi et al. | 717/158 |
| 2006/0242638 A1 | 10/2006 | Lew et al. | |
| 2006/0259981 A1 | 11/2006 | Ben-shoshan | |
| 2006/0287993 A1 | 12/2006 | Yao et al. | |
| 2007/0016672 A1 | 1/2007 | Wilson et al. | |
| 2007/0033201 A1 | 2/2007 | Stienhans | |
| 2007/0038974 A1 | 2/2007 | Albahari et al. | |
| 2007/0038983 A1 | 2/2007 | Stienhans | |
| 2007/0039009 A1 | 2/2007 | Collazo | |
| 2007/0101311 A1* | 5/2007 | Castelli et al. | 717/104 |
| 2007/0233628 A1 | 10/2007 | Sherwood et al. | |
| 2008/0127120 A1* | 5/2008 | Kosche et al. | 717/131 |
| 2008/0312899 A1 | 12/2008 | Li et al. | |
| 2008/0313149 A1 | 12/2008 | Li et al. | |
| 2008/0313184 A1 | 12/2008 | Li et al. | |
| 2008/0313213 A1 | 12/2008 | Zhang et al. | |
| 2008/0313507 A1 | 12/2008 | Mahmud et al. | |
| 2008/0313617 A1 | 12/2008 | Zhu et al. | |

FOREIGN PATENT DOCUMENTS

| | | |
|---|---|---|
| WO | 0075814 A1 | 12/2000 |
| WO | WO 01/75678 | 10/2001 |

OTHER PUBLICATIONS

Intel, VTune™ Performance Analyzer 8.1 for Linux* Getting Started Guide, 2006.*

Intel® VTune™ Performance Analyzer 7.2, 2005.*

Intel® VTune™Performance Analyzer 8.0 for Windows, 2006.*

Bowring, et al., "Monitoring Deployed Software Using Software Tomography", Date: 2002, pp. 2-9, ACM Press, NY, USA.

Neal, et al. "Playback: A Method for Evaluating the Usability of Software and Its Documentation", Human Factors Center, International Business Machines Corporation, San Jose, CA. Date: 1983, pp. 78-82, ACM Press, NY, USA.

"Usage Analytics For Rich Internet Applications (RIA)", 2006, Visible Measures Corp, Cambridge, MA, 2 pages.

Corbett et al., "Bandera: Extracting Finite state Models from Java Source Code", 2000, Proceedings of the 22nd Intl. Conference on Software Engineering, pp. 439-448.

Farina et al., "Representing Software Usage Models with Stochaistic Automata Networks", Jul. 15-19, 2002, SEKE '02, pp. 401-407.

Fischer, "User Modeling in Human-Computer Interaction", 2001, User Modeling and User-Adapted Interaction 11, pp. 65-86.

Gokhaie et al., "Software Reliability Analysis Incorporating Fault Detection and Debugging Activities", Nov. 1998, The 9th International Symposium on Software Reliability Engineering, 10 pages.

Jiawei et al., "Stream Cube: An Architecture for Multi-Dimensional Analysis of Data Streams", 2005, Distributed and Parallel Databases, v. 18, pp. 173-197.

Kratky, Michal, "Multi-dimensional Approach to Indexing XML Data", 2004, Ph.D Thesis, Department of Computer Science, Technical University of Ostrava, Czech Republic, 127 pages.

Li, Xiaolei, et al., "High-Dimensional OLAP: A Minimal Cubing Approach", 2004, Proceedings of the 30th VLDB Conference, pp. 528-539.

Li, Xiaoming, et al., "Analyzing the Uses of a Software Modeling Tool", 2006, LDTA, pp. 1-18.

Linton et al., "Building User and Expert Models by Long-Term Observation of Application Usage", 1999, Proceedings of the 7th Intl. conference on User Modeling, pp. 129-138.

Nagappan et al., "Towards a Metric Suite for Early Software Reliability Assessment", 2003, Fast Abstract at the International Symposium on Software Reliability Engineering (ISSRE) 2003, Denver, CO., 2 pages.

Orlandic et al., "Inverted-Space Storage Organization for Persistent Data of Very High Dimensionality", 2001, International Conference on Information Technology: Coding and Computing (ITCC '01), 6 pages.

Puerta et al., "XIML: A Common Representation for interaction Data", Jan. 13-16, 2002, IUP02, pp. 214-215.

Rosenberg, et al., "Software metrics and reliability", Nov. 1998, 9th International Symposium on Software Reliability, Germany, 8 pages.

Shah, Biren, "On Improving Information Retrieval Performance from Structured, Semistructured and Un-structured Information Sources", Fall 2005, Dissertation, University of Louisiana at Lafayette, 198 pages.

Titzer et al., "Nonintrusive Precision Instrumentation of Microcontroller Software", Jul. 2005, ACM SIGPLAN Notices, vol. 40, Issue 7, pp. 59-68.

Voas, "Third-Party Usage Profiling: A Model for Optimizing the Mass-Marketed Software Industry", 2000, Reliable Software Technologies. Sterling. VA, 9 pages.

U.S. Official Action dated Aug. 6, 2009 in U.S. Appl. No. 11/818,610.

U.S. Official Action dated Oct. 5, 2009 in U.S. Appl. No. 11/818,612.

U.S. Official Action dated Sep. 4, 2009 in U.S. Appl. No. 11/818,879.

U.S. Official Action dated Oct. 7, 2009 in U.S. Appl. No. 11/818,607.

U.S. Official Action dated Jul. 24, 2009 in U.S. Appl. No. 11/818,596.

U.S. Notice of Allowance / Allowability dated Jan. 13, 2010 in U.S. Appl. No. 11/818,610.

U.S. Notice of Allowance / Allowability dated Dec. 22, 2009 in U.S. Appl. No. 11/818,612.

U.S. Notice of Allowance / Allowability dated Jan. 6, 2010 in U.S. Appl. No. 11/818,879.

U.S. Notice of Allowance / Allowability dated Dec. 17, 2009 in U.S. Appl. No. 11/818,596.

U.S. Notice of Allowance / Allowability dated Apr. 6, 2010 in U.S. Appl. No. 11/818,607.

U.S. Notice of Allowance / Allowability dated Apr. 19, 2010 in U.S. Appl. No. 11/818,879.

* cited by examiner

| Session ID | Mem size | CPU | App | Exit type | User ID | ... |
|---|---|---|---|---|---|---|
| 0 | 223M | 1GHz | Word | Normal | 0 | ... |
| 1 | 511M | 2GHz | Word | Crash | 3 | ... |
| 2 | 512M | 733MHz | Word | Normal | 1 | ... |
| 3 | 768M | 1GHz | Excel | Normal | 0 | ... |
| 4 | 1024M | 1.5G Hz | Outlook | Crash | 2 | ... |
| 5 | 128M | 366MHz | Word | Normal | 2 | ... |
| 6 | 512M | 733MHz | Excel | Normal | 3 | ... |
| 7 | 192M | 366MHz | Excel | Normal | 5 | ... |
| 8 | 1024M | 2GHz | Outlook | Normal | 7 | ... |
| 9 | 512M | 1GHz | Word | Hang | 7 | ... |
| ... | ... | ... | ... | ... | ... | ... |

SOFTWARE FEATURE USAGE ANALYSIS AND REPORTING

CROSS-REFERENCE TO RELATED APPLICATIONS

The present application is related to the following copending U.S. patent applications, assigned to the assignee of the present application, filed concurrently and hereby incorporated by reference:

Analyzing Software Users with Instrumentation Data and User Group Modeling and Analysis, U.S. patent application Ser. No. 11/818,610;

Reliability Analysis Using Alerts, Asserts, and UI Controls, U.S. Pat. No. 7,681,085;

Multidimensional Analysis Tool for High Dimensional Data, U.S. patent application Ser. No. 11/818,607;

Efficient Data Infrastructure for High Dimensional Data Analysis, U.S. patent application Ser. No. 11/818,879;

Software Feature Modeling and Recognition, U.S. Pat. No. 7,680,645; and

Analyzing Software Usage with Instrumentation Data, U.S. patent application Ser. No. 11/818,611.

BACKGROUND

Understanding the way in which software users use software can be very valuable when working to improve the effectiveness and ease of use of software applications. Traditional ways to analyze software users include usability studies, user interviews, user surveys and the like.

Various data can be collected during actual software usage to obtain information related to how users use and otherwise interact with a software program. However, analyzing that data to obtain useful information is a difficult problem.

Moreover, contemporary software is getting more and more sophisticated as advanced features are introduced. However, traditional usability studies only provide knowledge about feature usage that was obtained in artificial environments, which is not sufficient to understand software feature usage in real world applications.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which usage of program features may be analyzed, including by determining feature usage metrics. Information representative of the feature usage metrics is output, such as in a report or the like.

Software instrumentation data is collected during actual user program usage sessions. The collected data is then processed to determine various feature usage counts and other information, cross-feature usage (e.g., among users who use a feature, how many use another feature or program), and characteristics of feature users, e.g., how long, how much, how often and how extensive feature users use a program. Session analysis may be performed to provide information about the number of sessions in which a set of features occur. Feature usage trends over time may also be determined via analysis.

In one example implementation, a system is described including an analyzer that processes information corresponding to the software instrumentation data recorded from user software program usage sessions to produce an output. The analyzer includes a feature usage analysis, a cross-feature usage analysis, an analysis of characteristics of feature users, a session analysis, and/or an analysis of feature usage trends. The analyzer may be coupled to a user interface for facilitating selection of one or more features, for facilitating selection of a group of users, and/or for outputting results corresponding to the analysis.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which:

FIG. 2 shows a representation in a table format of example software instrumentation (e.g., software quality metrics) data saved for various program usage sessions by users of a suite of application programs.

DETAILED DESCRIPTION

Various aspects of the technology described herein are generally directed towards analyzing software data collected from real software users to model and recognize software users' usage of software features. Based on such feature modeling and recognition, further analysis such as analyzing characteristics of feature users, cross-feature usage, session analysis (e.g., where a session is typically from program start to finish) and so forth may be performed to gain a better understanding of feature usage.

To this end, example analyses are described herein that evaluate feature usage, generally comprising information about how many users use a feature, the average length of a feature, and so forth, as well as cross-feature usage, generally an evaluation as to which users who use a feature also use another feature or feature set. Characteristics of feature users also may be analyzed, such as to evaluate how long, how much, how often and how extensive feature users use an application. Other types of analysis include session analysis, generally comprising information about the number of sessions in which a set of features occur, and analysis of feature usage trends over time.

For purposes of understanding, the technology is described herein by use of examples, including those that operate in various environments, such as internal users (e.g., corresponding to employees of the enterprise that is analyzing the software) and external users. Further, the programs exemplified herein are generally a suite of application programs such as those provided as part of the Microsoft® Office software product suite. However, as will be understood, these are only non-limiting examples, and the technology is applicable to different user environments and different software products, including individual application programs and operating system components.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing in general.

Figure 1:
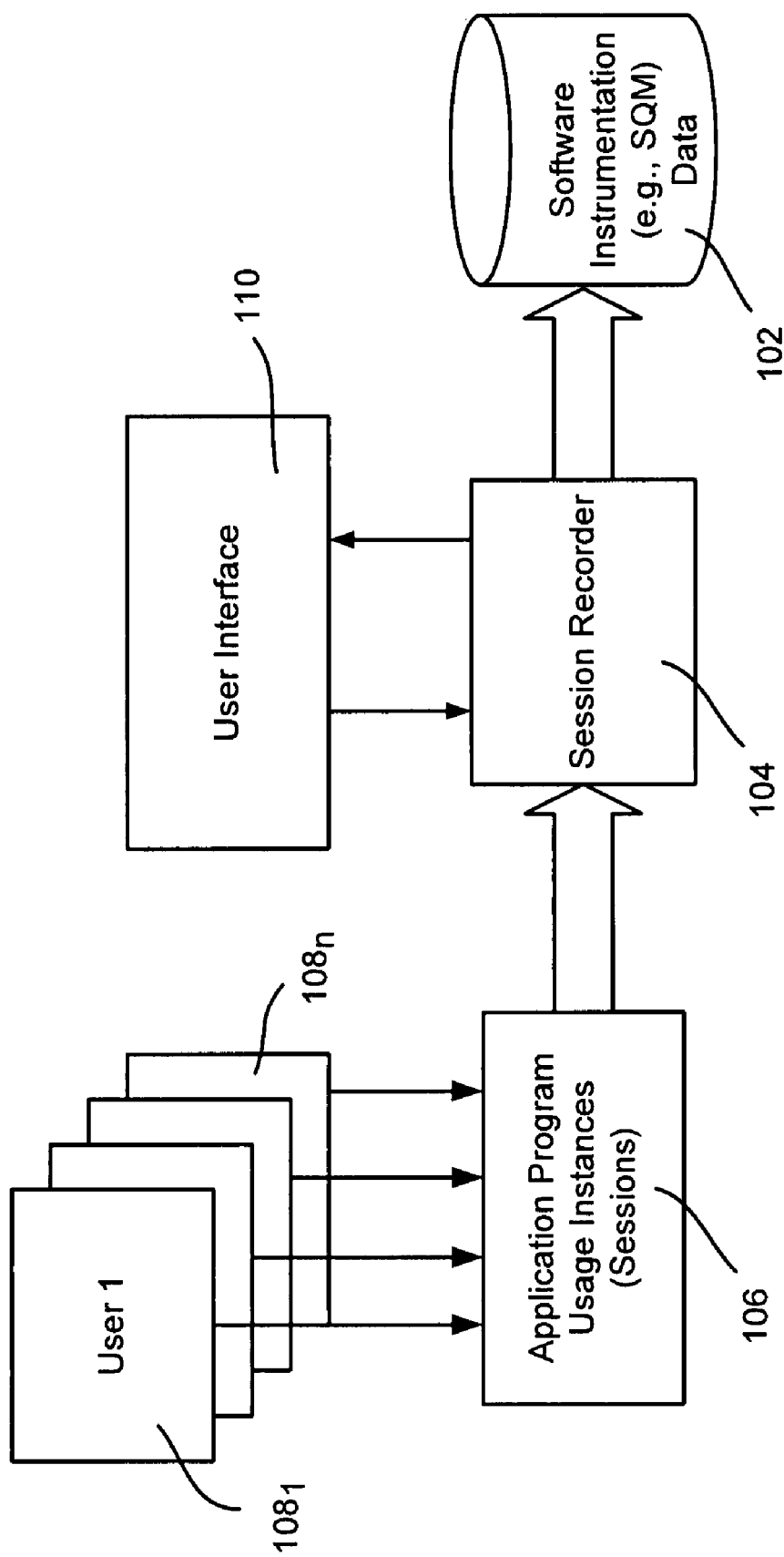
FIG. 1 shows an example representation of recording software instrumentation data for subsequent analysis.

Turning to FIG. 1, there is shown a mechanism for collecting software instrumentation data 102, including a session recorder 104 that collects various data from one or more application instances 106 corresponding to various users $108_1$-$108_n$, where n represents any practical number of users. The session recorder 104 may be per application instance/user, or may be a mechanism such as an agent on each computing device of a network that communicates with at least one data collection server component running on a network server or the like. A user interface 110 allows an test operator or the like to set collection parameters, such as from which program or programs to collect the instrumentation data, from which users to collect data, how long a collection session should last (if the program is not ended by the user within that time limit) and so forth.

In general, the instrumentation data 102 comprise data collected from each user session, where a session corresponds to actual usage by a user of an executing program. A typical session starts from the application start (e.g., by double clicking on the application executable or a document that launches the application executable, or by choosing the application from a start menu), and ends when the application is closed (e.g., by choosing "Exit" in the application or closing the application window). Sessions can also be time limited, e.g., if a session exceeds twenty-four hours, the session is ended and the instrumentation data to that point recorded (the application continues to run). Sessions can also end by non-normal termination of a program, e.g., because of program or system crashes.

FIG. 2 provides an example of one type of software instrumentation data 102, with some of the data (arranged in columns) collected for some number of sessions (arranged in rows); it is equivalent to have the sessions be in the columns and the rows represent the data. In one example implementation, each session is associated with some or all of the information shown in FIG. 2, including a session ID, a user ID, and an application name. Other information that is typically recorded includes the application version/build, a start time, an end time, the commands used during the session and still other data, such as the number of files opened and so forth. Note that in actual implementations, the instrumentation data 102 may be many thousands of dimensions.

Software features can be modeled and recognized from software instrumentation data. Based on feature modeling and recognition, further analysis such as analyzing characteristics of feature users, cross-feature usage, session analysis and so forth may be performed to gain an understanding of feature usage. From feature recognition, the sessions in which a feature occurred are obtained.

In general, feature recognition provides rich statistical information on how a feature is used, including for example, feature occurrence, feature command count, average length and so on. The information can be filtered and formatted for feature usage analysis and reporting.

Figure 3:
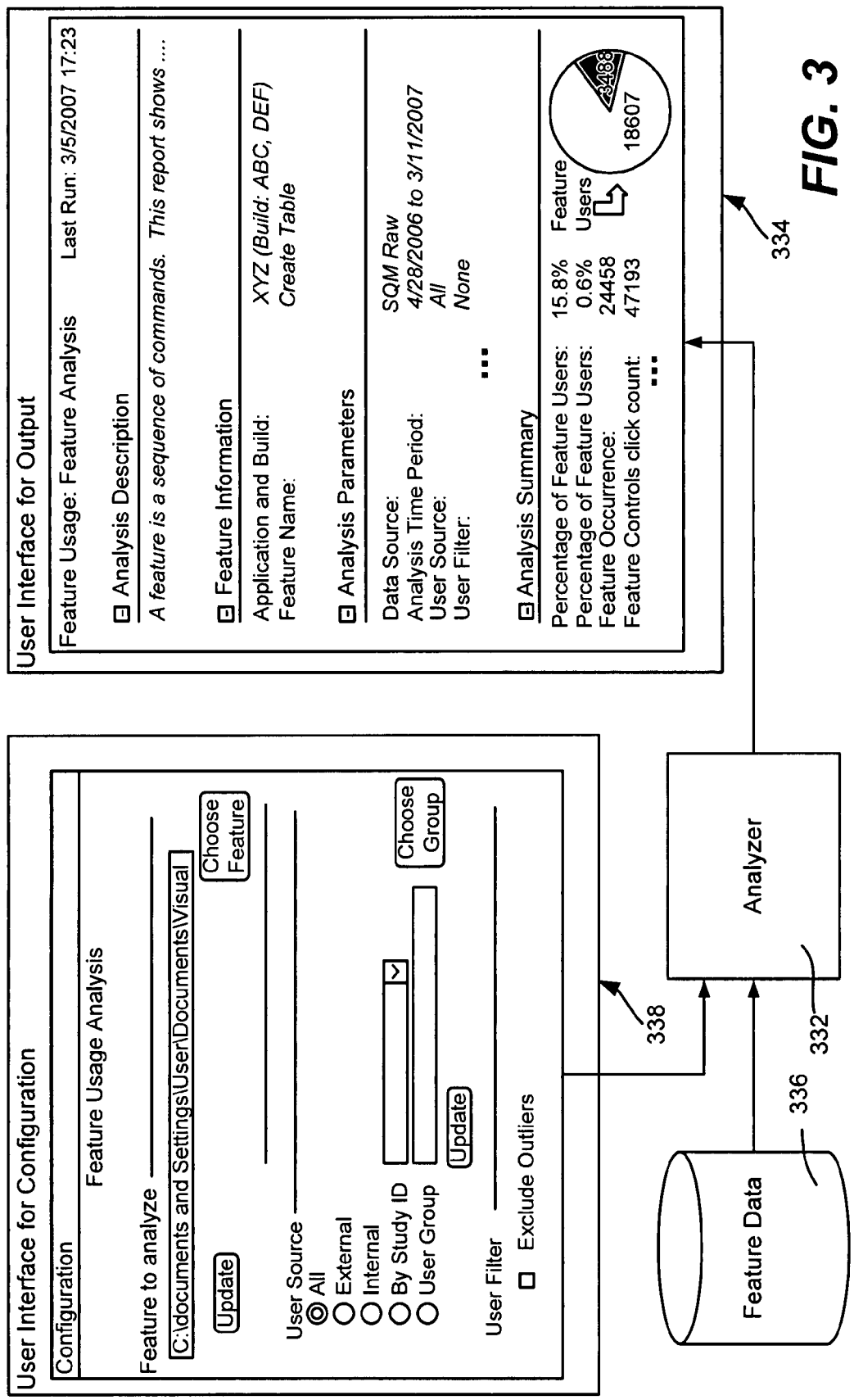
FIG. 3 shows an example representation of a user interface and analyzer for analyzing software feature data based on the software instrumentation data.

To analyze software feature usage, the software instrumentation data 102 is processed, such as to measure the overall usage of a feature by a group of users. FIG. 3 shows example analysis components, including an analyzer 332 that generates an output report 334 from some set of feature data 336. Note that the data 336 may be first pre-processed into any suitable data structure or set of data structures, and/or the features recognized therein, such as described in the aforementioned U.S. patent applications entitled "Multidimensional Analysis Tool for High Dimensional Data," "Efficient Data Infrastructure for High Dimensional Analysis" and "Software Feature Modeling and Recognition." Further, the data may be accessed via a client/service architecture, such as described in the aforementioned U.S. patent application entitled "Analyzing Software Usage with Instrumentation Data," in which a data explorer system manages the data for the analysis and provides access to the data via APIs.

A user interface 336 establishes the parameters, criteria and which metrics are used to analyze the feature data 334. FIG. 3 shows an example UI and implementation of such an analysis. As can be seen, given the set of feature data 336 (e.g., with application and version/build information included in the feature selection), filters such as a source of users and whether to exclude outliers can be specified, (outliers are described below).

As generally represented in FIG. 3, the source of users can be specified. Some examples include all users from whom instrumentation data have been collected (All), users who are external customers and not employees of the company conducting the analysis (External), users who are employees (Internal), users who are from a particular group that has been set up to collect data (Study ID, for example, the beta participants of a next software release), or a custom group. Note that such custom groups are described in the aforementioned U.S. patent application entitled "Analyzing Software Users with Instrumentation Data and User Group Modeling and Analysis."

With respect to outliers, a type of user is a potential outlier if his or her use of a feature is substantially different from those of most other users. Various criteria can be used to determine an outlier, such as the entropy of the occurrence distribution of each feature. The smaller the entropy, the more unevenly distributed the occurrence of the feature among the set of all users. For example, if the entropy is less than one-half (0.5), a first criterion is met. Additionally, the average occurrence per session of the feature by this user may be considered, e.g., the total occurrence of the feature divided by application session count of the user. If the average occurrence per session is greater than some number, such as one-hundred, the second criterion is met. In this example, any user who meets the two criteria can be grouped and reported; in this example, the user is an outlier that is likely using automation.

Figure 4:
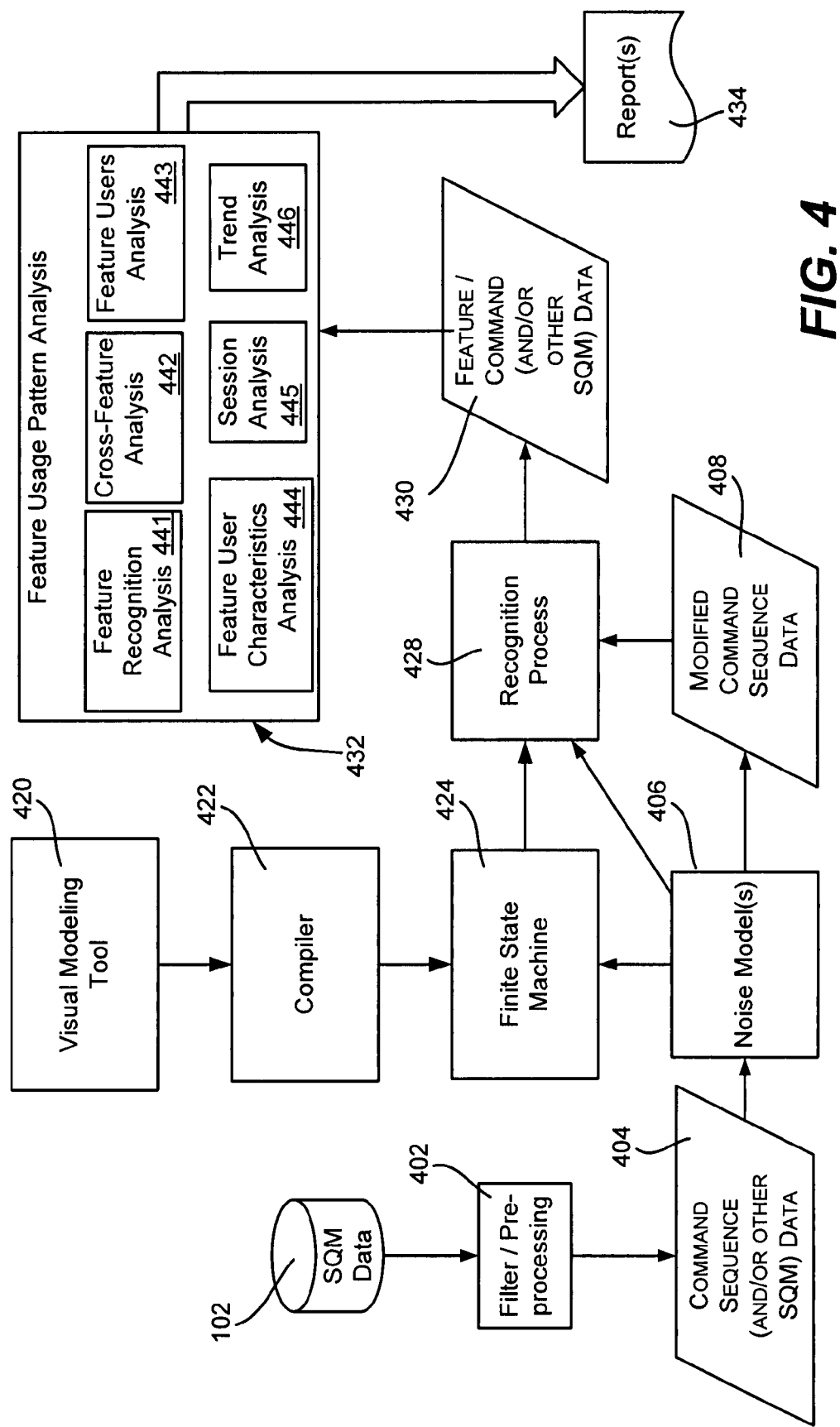
FIG. 4 shows a representation of various example concepts related to analyzing feature usage.

In this manner, given a set of software instrumentation data, which for analyzing program is sometimes referred to as Software (or Service) Quality Metrics (SQM) data, feature usage may be analyzed. FIG. 4 shows various example components for processing and analyzing SQM data (or similar data) with respect to feature usage and types of analysis. Note that the SQM data 102 may first be filtered and otherwise pre-processed (block 402), e.g., so that only the commands used in features are efficiently accessed, as represented by the block labeled 404. Further, some commands in a sequence of commands are not part of feature usage, and are referred to as noise; one or more noise models 406 described below may be applied to modify the command sequence data (block 408) such as to eliminate such commands.

As described in the aforementioned U.S. patent application entitled "Software Feature Modeling and Recognition," a visual modeling tool 420 allows an operator of the analysis to define aspects of feature analysis. A compiler 422 compiles the output of the modeling tool 420 into a finite state machine 424. A recognition process 428 uses the finite state machine to locate feature usage. Data 430 corresponding to the recognized feature usage and commands may then be analyzed (block 432) and output as information in some way, such as in one or more reports 434. Note that the analyzer 332 and output 334 of FIG. 3 may correspond to blocks 432 and 434 of FIG. 4, respectively.

As described below, given information corresponding to a set of instrumentation data, various types of analyses may be performed. Some of these types are exemplified in FIG. 4, namely feature recognition (and instrumentation data) analysis 441, cross-feature analysis 442, feature users analysis 443, feature user characteristics analysis 444, session analysis 445, and trend analysis 446. One or more other types of feature analysis are feasible, but are not shown in FIG. 4 for purposes of simplicity.

Information from feature recognition and instrumentation data (block 441), such as the total number of users of the application (a given version/build), can be used to obtain the following information:

| | |
|---|---|
| Percentage of feature users | Percentage of application users who use the feature. |
| Percentage of feature sessions: | Percentage of application sessions in which the feature occurred. |
| Feature occurrence | Total number of times the feature occurred in analysis data. (Analysis data is the data set for analysis, e.g., the set of data given the source of users, application and version/build. Feature occurrence includes exact matches and matches with noise, e.g., with unnecessary steps such as menu browsing in the middle of the feature.) |
| Feature controls click count | Total number of clicks of necessary commands (i.e. those defined in the feature) in occurrences of the feature. |
| Noise click count | Total number of clicks of unnecessary commands (such as menu browsing) in occurrences of the feature |
| Average feature length | Average number of feature control clicks and noise clicks per feature occurrence. |
| Feature clicks-total clicks ratio | Ratio of the sum of feature controls click count and noise click count to the total number of clicks for the application. |
| Feature clicks details | Click count of each command and enum in the feature (the Enum element models a set of commands; each Enum has a unique name, and it can be called by a Feature, Procedure or another Enum. In execution, only one of the child elements is executed). |
| Enum/command details | Click count of each command and enum broken down by command properties. |
| Noise details | Exact match occurrence and noise click count. |
| Feature path details | Top n (e.g., ten) paths of the feature, including the total occurrence and commands that make up the path. Each path is a way the feature may be executed. |
| Feature length distribution | Distribution of feature length. |

Cross-feature usage analysis 442 answers questions such as how many users who use a certain feature also use another feature, and for a group of features, how many users use all (or some other specified set) of the features in the group. Based on feature recognition results, cross-feature usage can be measured by users who use all (or some specified set of) the features, usage of features by users who use all (or some specified set of) the features, and percentage of <feature name 1> users who use <feature name 2>.

Users who use all (or some specified set of) the features (note: may be repeated for each application):

| | |
|---|---|
| User count | Number of users who use the specified (e.g., all) features. |
| Users who use all the applications | Number of users who use all the applications to which the features belong. For example, if two features are chosen for this analysis, one is a Word 2003 (SP1) feature and the other is a PowerPoint 2003 (Office 2003 Important Builds) feature, this refers to the number of users who use both Word 2003 (SP1) and any of the important builds (RTM, SP1 and SP2) of PowerPoint 2003. |
| Percentage | Ratio of User count to Users who use all the applications. |

Usage of features by users who use all (or some specified set of) the features (block 443; note: may be repeated for each feature):

| | |
|---|---|
| <feature name> total occurrence | Total occurrence of the feature by users who use the specified (e.g., all) features |

<feature name> users (repeat for each feature):

| | |
|---|---|
| Feature user count | Number of users who use the feature. |
| <application name> (builds) user count | Number of users who use the application (of the specified builds). |
| Percentage | Ratio of feature user count to the <application name> (builds) user count. |
| Occurrence | Total occurrence of the feature by feature users. |

Percentage of <feature name 1> users who use <feature name 2> (repeat for each remaining feature, and then repeat for each feature):

| | |
|---|---|
| Percentage of <feature name 1> users who use <feature name 2> | Percentage of <feature name 1> users who use <feature name 2>. |
| Usage of <feature name 1> (occurrence) | Total occurrence of <feature name 1> by these users. |
| Usage of <feature name 2> (occurrence) | Total occurrence of <feature name 2> by these users. |

Feature user characteristics analysis 443 is directed towards resolving questions such as how often and how much do feature users use an application, and what types of users they are when using an application. Feature users may be users who use all of the features specified, any one of the features specified, or none of the features specified. Based on feature recognition results, characteristics of these users can be measured by:

| | |
|---|---|
| Average session count | Average number of application sessions by these users. This indicates on average, how much the users have been using the application during a time period. One suitable calculation is: get the session count (total number of application sessions) of each user, and average across all the users in the group. |
| Average session frequency | Average time between consecutive sessions by users. This indicates on average, how frequent the users use the application. One suitable calculation is: get the session elapse time (the time between the end of the last session and the end of the first session) of each user, get the session frequency (session elapse time divided by session count) of each user, average across some set of (e.g., all) users. |
| Average total running time | Average total session time by users. This is another indication of on average, how much the analysis users have been using the application. One suitable calculation is: get the total running time (sum of all session time) of each user, average across the users. |
| Average session length | Average session time by users. This indicates on average, how much time users spend in each session using the application. One suitable calculation is: get the average session length (total running time divided by session count) of each user, average across the users. |
| Average depth of usage | Average percentage of total commands of the application used by users. This indicates how deep users use the application. One suitable calculation is: get the depth of usage (percentage of total application commands used by the user, where total application commands is the total number of distinct commands found in the command stream of the application so far, and used by the user is defined as the command found at least once in the command stream of the user) of each user, average across the users. For example, users can be characterized as beginner, intermediate, advanced and expert users depending on their depth of usage. |

The distribution of the above measures can also be obtained by counting how many or percentage of users whose values fall within an interval. The application and version/build for which the analysis is being conducted can also be specified.

Session analysis 445 is directed to answering questions such as how many users use a set of features in the same session, and how frequent these sessions are. Based on feature recognition results, session analysis may include:

| | |
|---|---|
| <application name> session count: | Total number of sessions of the application. |
| Sessions in which features occurred | Total number of sessions in which some specified set of (e.g., all) the features occurred in the session. |
| Percentage of sessions | Percentage of application sessions in which some specified set of (e.g., all) the features occurred, i.e. the ratio of the two numbers above. |
| <application name > user count | Total number of application users. |

-continued

| | |
|---|---|
| Users who use the features in the same session | Total number of users who use some specified set of (e.g., all) the features in the same session. |
| Percentage of users | Percentage of application users who use some specified set of (e.g., all) the features in the same session, i.e. the ratio of the two numbers above. |
| Frequency distribution | Frequency of sessions by users. Shows how many and the percentage of users who use some specified set of (e.g., all) the features in the same session whose frequency of such sessions (i.e. ratio of the number of sessions in which some specified set of (e.g., all) the features occurred in the same session and total session count of the user) falls within an interval. |

Session analysis also may include basic information of each feature such as the session count and user count of each feature. Feature <feature name> (repeat for each feature):

| | |
|---|---|
| Session count | Total number of sessions in which the feature occurred. |
| User count | Total number of users who used the feature. |
| Percentage of sessions | Percentage of application sessions in which the feature occurred. |
| Percentage of users | Percentage of application users who used the feature. |

Trend analysis 446 of feature usage is directed towards resolving questions such as whether the percentage of users who use a feature changed since the launch of the newest version/build of a software product. Based on feature recognition results, the trend of using a feature, e.g., usage of a feature over time, can be measured. The feature and the source of users can be specified, as can the period to analyze and reporting interval can also be specified. For example, the period to analyze can be an absolute period such as the time period from a start date to an end date, or a relative period, for example, each user's enrollment length which refers to the time period from a user's first session to the last session. A reporting interval is the interval to report the measures. This may be monthly, weekly, daily, or another interval.

The following table sets for some example data that can be used to analyze feature usage trends:

| | |
|---|---|
| Feature User Count | Total number of users using the feature during a reporting interval. |
| Feature Session Count | Total number of sessions in which the feature occurred during a reporting interval. |
| Feature Occurrence | Total number of times the feature occurred during a reporting interval. |
| Feature Occurrence/User | Feature occurrence divided by feature user count during a reporting interval. |
| Feature Occurrence/Session | Feature occurrence divided by feature session count during a reporting interval. |
| Application Count | Total number of users using the application during a reporting interval. |
| Percentage of Users | Feature user count divided by application user count during a reporting interval. |

-continued

| | |
|---|---|
| Application Session Count: | Total number of sessions of the application during a reporting interval. |
| Percentage of Sessions | Feature session count divided by application session count during a reporting interval. |
| Cumulative Feature Occurrence | Total number of times the feature occurred from the start time of the period to analyze to the end of each reporting interval. |
| Cumulative Percentage of Users | Percentage of users from the start time of the period to analyze to the end of each reporting interval. |
| Cumulative Percentage of Sessions | Percentage of sessions from the start time of the period to analyze to the end of each reporting interval. |

Figure 5:
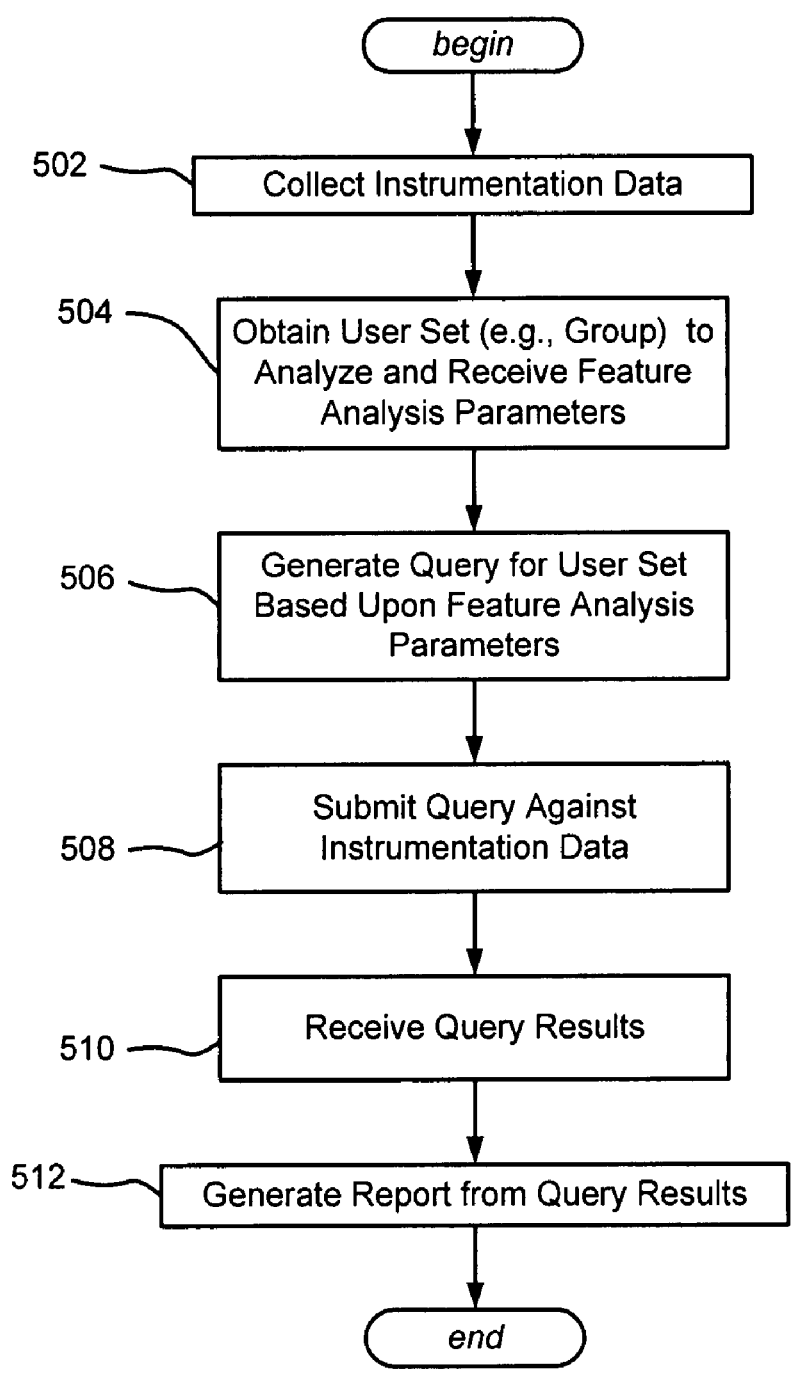
FIG. 5 is a flow diagram representing various example concepts related to analyzing software feature usage and users.

FIG. 5 summarizes an overall example process, beginning at step 502 which represents collecting the software instrumentation data. As is readily understood, the software instrumentation data may be collected at any previous time, not necessarily just prior to analysis.

Step 504 represents obtaining the analysis criteria (e.g., feature usage, trend analysis and/or others), and obtaining the user set, which may be all, external, internal, a user group and so forth as set above. Step 506 generates a query from the operator-input analysis and/or user filtering criteria.

Step 508 represents submitting the query against the software feature data (in any appropriate format), with step 510 representing receiving the query results. Step 512 represents generating the report, which may include performing calculations on the results as needed to match the operator's requirements. For example, as described above, some of the report can include information that is not directly measured but is computed from a combination of two or more measured sets of data.

Exemplary Operating Environment

Figure 6:
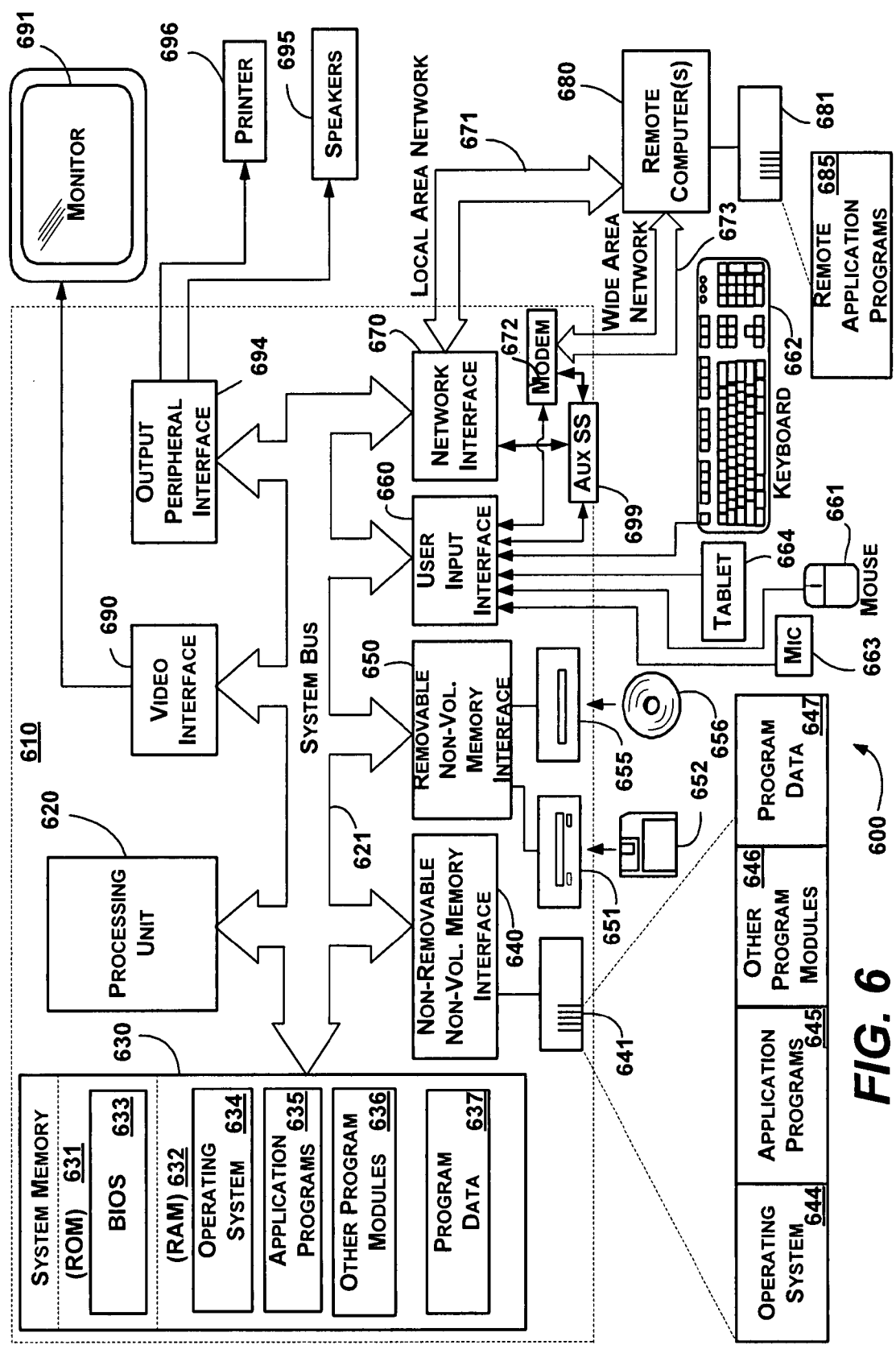
FIG. 6 is an illustrative example of a general-purpose computing environment into which various aspects of the present invention may be incorporated.

FIG. 6 illustrates an example of a suitable computing system environment 600 on which some or all of the various components (e.g., represented in FIG. 4) may be implemented. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 6, an exemplary system for implementing various aspects of the invention may include a general purpose computing device in the form of a computer 610. Components of the computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 610 typically includes a variety of computer-readable media. Computer-readable media can be any available media that can be accessed by the computer 610 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 610. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636 and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media, described above and illustrated in FIG. 6, provide storage of computer-readable instructions, data structures, program modules and other data for the computer 610. In FIG. 6, for example, hard disk drive 641 is illustrated as storing operating system 644, application programs 645, other program modules 646 and program data 647. Note that these components can either be the same as or different from operating system 634, application programs 635, other program modules 636, and program data 637. Operating system 644, application programs 645, other program modules 646, and program data 647 are given different numbers herein to illustrate that, at a minimum, they are different copies. A user may enter commands and information into the computer 610 through input devices such as a tablet, or electronic digitizer, 664, a microphone 663, a keyboard 662 and pointing device 661, commonly referred to as mouse, trackball or touch pad. Other input devices not shown in FIG. 6 may include a joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. The monitor 691 may also be integrated with a touch-screen panel or the like. Note that the monitor and/or touch screen panel can be physically coupled to a housing in which the computing device 610 is incorporated, such as in a tablet-type personal computer. In addition, computers such as the computing device 610 may also include other peripheral output devices such as speakers 695 and printer 696, which may be connected through an output peripheral interface 694 or the like.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include one or more local area networks (LAN) 671 and one or more wide area networks (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660 or other appropriate mechanism. A wireless networking component 674 such as comprising an interface and antenna may be coupled through a suitable device such as an access point or peer computer to a WAN or LAN. In a networked environment, program modules depicted relative to the computer 610, or portions thereof, may be stored in the remote memory storage device. By way of example, and not limitation, FIG. 6 illustrates remote application programs 685 as residing on memory device 681. It may be appreciated that the network connections shown are exemplary and other means of establishing a communications link between the computers may be used.

An auxiliary subsystem 699 (e.g., for auxiliary display of content) may be connected via the user interface 660 to allow data such as program content, system status and event notifications to be provided to the user, even if the main portions of the computer system are in a low power state. The auxiliary subsystem 699 may be connected to the modem 672 and/or network interface 670 to allow communication between these systems while the main processing unit 620 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
analyzing software instrumentation data collected from user sessions corresponding to one or more programs, wherein analyzing the software instrumentation data comprises determining feature usage metrics associated with a feature of the one or more programs, wherein the feature usage metrics include feature usage, cross-feature usage, and feature usage trends; and
upon determining the feature usage metrics, outputting information representative of at least one of the determined feature usage metrics associated with a feature of the one or more programs.

2. The method of claim 1 further comprising, collecting the instrumentation data during actual user sessions.

3. The method of claim 1 wherein determining the feature usage metrics comprises determining for a set of users a percentage of feature sessions information corresponding to a percentage of program sessions in which the feature occurred and at least one of: percentage of feature users information corresponding to a percentage of program users who use the feature, feature occurrence information corresponding to a number of times the feature occurred, feature controls count information corresponding to a number of uses of necessary commands, noise count information corresponding to a number of uses of unnecessary commands, feature length information corresponding to a number of feature control clicks and noise clicks per feature occurrence, feature ratio information corresponding to ratio of the sum of feature controls count and noise count to total click count, feature details information corresponding to a count of each command in the feature, command details information corresponding to a count of each command broken down by command properties, noise details information corresponding to exact match occurrence and noise click count, feature path details information corresponding to a number of paths of the feature, including total occurrence and commands that make up the path, and feature length distribution information.

4. The method of claim 1 wherein determining the feature usage metrics comprises determining cross-feature usage for a set of users, a specified set of one or more features, and a specified set of one or more programs.

5. The method of claim 4 wherein determining the cross-feature usage comprises determining information corresponding to at least one of: user count information corresponding to a number of users who use all or a specified set of the specified features, program usage information corresponding to a number of users who use all the specified programs, feature usage corresponding to occurrence of the feature by users who use all or a specified set of the specified features, feature user count corresponding to a number of users who use the feature, program user count corresponding to a number of users who use the application, and occurrence information corresponding to a count of occurrence of the feature by feature users.

6. The method of claim 1 wherein determining the feature usage metrics comprises determining feature user characteristics for a set of users, including determining at least one of: session count information corresponding to a number of application sessions by the users, session frequency information corresponding to a time between consecutive sessions by users, running time information corresponding to a session time by users, session length information corresponding to session time by users, depth of usage information corresponding to a percentage of total commands of the application used by users.

7. The method of claim 1 wherein determining the feature usage metrics comprises performing a session analysis for a specified set of one or more features, comprising determining at least one of: session count information corresponding to a number of program sessions by users, occurrence information corresponding to a number of sessions in which the specified feature or features occurred in the session, percentage of sessions information corresponding to a percentage of application sessions in which the specified feature or features occurred, user count information corresponding to a total number of program users, user same session information corresponding to a number of users who used the specified feature or features in the same session, percentage of users information corresponding to a percentage of program users who use the specified feature or features in the same session, frequency of sessions by users information, and distribution information corresponding to a number and percentage of users who use specified feature or features in the same session whose frequency of such sessions falls within each interval.

8. The method of claim 1 further comprising, analyzing the information corresponding to the software instrumentation data to determine at least one feature usage trend over time.

9. The method of claim 8 wherein analyzing the information corresponding to the software instrumentation data to determine at least one feature usage trend over time comprises determining information corresponding to at least one of: feature user count information corresponding to a number of users using a feature during a reporting interval, feature session count information corresponding to a number of sessions in which a feature occurred during a reporting interval, feature occurrence information corresponding to a number of times a feature occurred during a reporting interval, feature occurrence and user information corresponding to the feature occurrence divided by the feature user count during a reporting interval, feature occurrence and session information corresponding to the feature occurrence divided by the feature session count during a reporting interval, program count information corresponding to a number of users using a program with the feature during a reporting interval, percentage of users information corresponding to the feature user count divided by the program count during a reporting interval, program session count information corresponding to a number of sessions of a program with the feature during a reporting interval, percentage of sessions information corresponding to the feature session count divided by the program session count during a reporting interval, cumulative feature occurrence information corresponding to a number of times a feature occurred from a start time of a period to analyze to an end of each reporting interval, cumulative percentage of users information corresponding to a percentage of feature users from a start time of a period to analyze to an end of each reporting interval, and cumulative percentage of sessions information corresponding to a percentage of feature sessions from a start time of a period to analyze to an end of each reporting interval.

10. The method of claim 1, wherein analyzing the information corresponding to the software instrumentation data further comprises determining at least one potential outlier corresponding to feature usage that appears different from feature usage by other users.

11. A computer-readable medium having computer executable instructions, which when executed, perform operations comprising:
analyzing information related to software instrumentation data collected during program usage sessions of a program including one or more features, analyzing information including determining feature usage metrics associated with the usage of one or more features by at least some users during at least some of the program usage sessions, wherein the feature usage metrics include feature usage, cross-feature usage, and feature usage trends; and
upon determining feature usage metrics, outputting information representative of the determined feature usage metrics associated with the usage of one or more features by at least some users during at least some of the program usage sessions of the analysis.

12. The computer-readable medium of claim 11 wherein analyzing the information comprises performing one or more of: a feature usage analysis, a cross-feature usage analysis, an analysis of characteristics of feature users, and a session analysis.

13. The computer-readable medium of claim 11 wherein outputting information representative of the determined feature usage metrics associated with the feature of the program comprises outputting a report to a user interface.

14. The computer-readable medium of claim 11 having further computer-executable instructions which when executed, perform operations comprising, receiving analysis parameters via a user interface, including at least one of receiving a selection of at least one feature and a user source.

15. In a computing environment, a system comprising:
an analyzer that processes information corresponding to software instrumentation data recorded from user software program usage sessions, to produce an output, wherein the information includes information corresponding to one or more features of one or more software programs
wherein the analyzer includes
means for performing a feature usage analysis, a cross-feature usage analysis, and a feature usage trend analysis on the information corresponding to one or more features of one or more software programs, and means for outputting information representative of the feature usage analysis, the cross-feature usage analysis, and the feature usage trend analysis corresponding to one or more features of one or more software programs.

16. The system of claim 15 further comprising a user interface coupled to the analyzer for facilitating selection of one or more features.

17. The system of claim 16 wherein the user interface further facilitates selection of a group of users.

18. The system of claim 15 further comprising a user interface coupled to the analyzer for outputting results corresponding to the analysis.

19. The system of claim 15 further comprising means for filtering at least some of the information corresponding to the software instrumentation data.

20. The system of claim 15 wherein the analyzer is coupled to a recognition process that recognizes features from the information corresponding to the software instrumentation data.

* * * * *

UNITED STATES PATENT AND TRADEMARK OFFICE
CERTIFICATE OF CORRECTION

| | |
|---|---|
| PATENT NO. | : 7,747,988 B2 |
| APPLICATION NO. | : 11/818600 |
| DATED | : June 29, 2010 |
| INVENTOR(S) | : Wenli Zhu et al. |

It is certified that error appears in the above-identified patent and that said Letters Patent is hereby corrected as shown below:

In Title page, in Item (75), under "Inventors" column 1, line 6, delete "Adan" and insert -- Adnan --, therefor.

Signed and Sealed this
Eighth Day of February, 2011

David J. Kappos
*Director of the United States Patent and Trademark Office*